(12) United States Patent
Adzic et al.

(10) Patent No.: US 11,546,597 B2
(45) Date of Patent: Jan. 3, 2023

(54) BLOCK-BASED SPATIAL ACTIVITY MEASURES FOR PICTURES

(71) Applicant: OP Solutions, LLC, Amherst, MA (US)

(72) Inventors: Velibor Adzic, Boca Raton, FL (US);
Hari Kalva, Boca Raton, FL (US);
Borivoje Furht, Boca Raton, FL (US)

(73) Assignee: OP Solutions, LLC, Amherst, MA (US)

( * ) Notice: Subject to any disclaimer, the term of this patent is extended or adjusted under 35 U.S.C. 154(b) by 0 days.

(21) Appl. No.: 17/332,131

(22) Filed: May 27, 2021

(65) Prior Publication Data

US 2021/0289206 A1    Sep. 16, 2021

Related U.S. Application Data

(63) Continuation of application No. PCT/US2019/063704, filed on Nov. 27, 2019.

(60) Provisional application No. 62/771,909, filed on Nov. 27, 2018.

(51) Int. Cl.
*H04N 19/124* (2014.01)
*H04N 19/176* (2014.01)
*H04N 19/625* (2014.01)
*H04N 19/82* (2014.01)

(52) U.S. Cl.
CPC ......... *H04N 19/124* (2014.11); *H04N 19/176* (2014.11); *H04N 19/625* (2014.11); *H04N 19/82* (2014.11)

(58) Field of Classification Search
CPC .. H04N 19/124; H04N 19/176; H04N 19/625; H04N 19/82
See application file for complete search history.

(56) References Cited

U.S. PATENT DOCUMENTS

| | | | |
|---|---|---|---|
| 2007/0248163 A1* | 10/2007 | Zuo | H04N 19/176 375/240.2 |
| 2010/0309974 A1 | 12/2010 | Reznik | |
| 2012/0020583 A1* | 1/2012 | Lee | G06F 17/147 382/250 |
| 2015/0016510 A1* | 1/2015 | Carlsson | H04N 19/198 375/240.03 |
| 2016/0156937 A1* | 6/2016 | Yang | H04N 19/176 375/240.16 |
| 2018/0343469 A1* | 11/2018 | Jin | H04N 19/59 |

FOREIGN PATENT DOCUMENTS

| | | | | |
|---|---|---|---|---|
| EP | 2373049 A1 * | 10/2011 | | H04N 17/004 |
| KR | 20200053482 A * | 9/2018 | | |

OTHER PUBLICATIONS

International Search Report; PCT/US19/63704; dated Feb. 21, 2020; By: Authorized Officer: Lee Young.

* cited by examiner

*Primary Examiner* — Md N Haque
(74) *Attorney, Agent, or Firm* — OP Solutions IP Department; Paul Ackerman

(57) ABSTRACT

An encoder includes circuitry configured to receive a video frame, partition the video frame into a plurality of blocks, determine a respective spatial activity measure for each block in the plurality of blocks and using a transform matrix, encode the video frame using the spatial activity measure. Related apparatus, systems, techniques and articles are also described.

10 Claims, 4 Drawing Sheets

US 11,546,597 B2

BLOCK-BASED SPATIAL ACTIVITY MEASURES FOR PICTURES

CROSS-REFERENCE TO RELATED APPLICATIONS

This application claims the benefit of priority of International Application No. PCT/US19/63704, filed on Nov. 27, 2019 and entitled "BLOCK-BASED SPATIAL ACTIVITY MEASURES FOR PICTURES," the entirety of which is incorporated herein by reference, which This application claims the benefit of priority of U.S. Provisional Patent Application Ser. No. 62/771,909, filed on Nov. 27, 2018, and titled "BLOCK-BASED SPATIAL ACTIVITY MEASURE FOR PICTURES," which is incorporated by reference herein in its entirety.

FIELD OF THE INVENTION

The present invention generally relates to the field of video compression. In particular, the present invention is directed to block-based spatial activity measures for pictures.

BACKGROUND

A video codec can include an electronic circuit or software that compresses or decompresses digital video. It can convert uncompressed video to a compressed format or vice versa. In the context of video compression, a device that compresses video (and/or performs some function thereof) can typically be called an encoder, and a device that decompresses video (and/or performs some function thereof) can be called a decoder.

A format of the compressed data can conform to a standard video compression specification. The compression can be lossy in that the compressed video lacks some information present in the original video. A consequence of this can include that decompressed video can have lower quality than the original uncompressed video because there is insufficient information to accurately reconstruct the original video.

There can be complex relationships between the video quality, the amount of data used to represent the video (e.g., determined by the bit rate), the complexity of the encoding and decoding algorithms, sensitivity to data losses and errors, ease of editing, random access, end-to-end delay (e.g., latency), and the like.

During encoding, a picture (e.g., video frame) is segmented (e.g., partitioned) into relatively large blocks, such as 128×128 and such structure is fixed. But by segmenting a picture into large blocks for compression and without taking into consideration the underlying video information (e.g., the video content), the large blocks may not partition the picture in a manner that allows for efficient encoding, thereby resulting in poor bit-rate performance.

SUMMARY OF THE DISCLOSURE

In an aspect, a video bitstream processor includes an inverse quantizer, an inverse transform processor, an in loop filter, a decoded picture buffer, wherein the video bitstream processor is configured to receive, using the inverse quantizer, a video bit stream including a picture comprising quantized pixels, wherein, the picture includes a first region comprising a first plurality of blocks, the picture includes a second region comprising a second plurality of blocks, the first region has a first quantization parameter controlled by an encoder based on a first average of the spatial activity measures of the first plurality of blocks, the second region has a second quantization parameter controlled by the encoder based on a second average of the spatial activity measures of second plurality of blocks, and each block of the plurality of blocks is assigned to the first or second region by the encoder based on a spatial activity measure for the block determined using a discrete cosine transform.

In another aspect, a method includes receiving, by a video bitstream processor including an inverse quantizer, an inverse transform processor, an in loop filter, and a decoded picture buffer, a video bit stream including a picture comprising quantized pixels, wherein the picture includes a first region comprising a first plurality of blocks, the picture includes a second region comprising a second plurality of blocks, the first region has a first quantization parameter controlled by an encoder based on a first average of the spatial activity measures of the first plurality of blocks, the second region has a second quantization parameter controlled by the encoder based on a second average of the spatial activity measures of second plurality of blocks, and each block of the plurality of blocks is assigned to the first or second region by the encoder based on a spatial activity measure for the block determined using a discrete cosine transform.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted. Like reference symbols in the various drawings indicate like elements.

DETAILED DESCRIPTION

Some implementations of the current subject matter are directed to an approach to encoding a video that includes using a measure of spatial activity that may include computing frequency components utilizing transform matrices. Utilizing transform matrices produces frequency measures in more frequencies than an encoder that utilizes a high-pass filter and the additional information may improve encoding. For example, by determining frequency components using transform matrices, more precise information about frequency components of a video frame can be produced. And by utilizing more precise information about frequency components, block-fusion can be improved, which, in turn, can improve prediction, thereby reducing the residual and resultant bitstream bitrate.

In some implementations, picture segmentation is performed using sample blocks as a basic unit. Sample blocks may have a uniform sample block size, which may a side length, in pixels of a square of pixels; for instance and without limitation, embodiments disclosed herein may use 4×4 sample blocks as a basic unit and the measure of spatial activity that includes computing frequency components of the 4×4 sample blocks. By utilizing 4×4 blocks as a basic segmentation size some implementations of the current subject matter may allow for finer granularity by the encoder and such a size aligns with established transform block sizes, enabling utilizing of standard and defined transform matrices, which may improve encoding efficiency. Further, such an approach may be contrasted with some existing approaches to encoding, which use fixed block structure of relatively large size. Persons skilled in the art, upon reviewing the entirety of this disclosure, will appreciate that, while for the same of brevity 4×4 sample blocks are described in many ensuing examples, in general any size or shape of sample blocks, according to any method of measurement, may be used for picture partitioning and/or segmentation.

Figure 1:
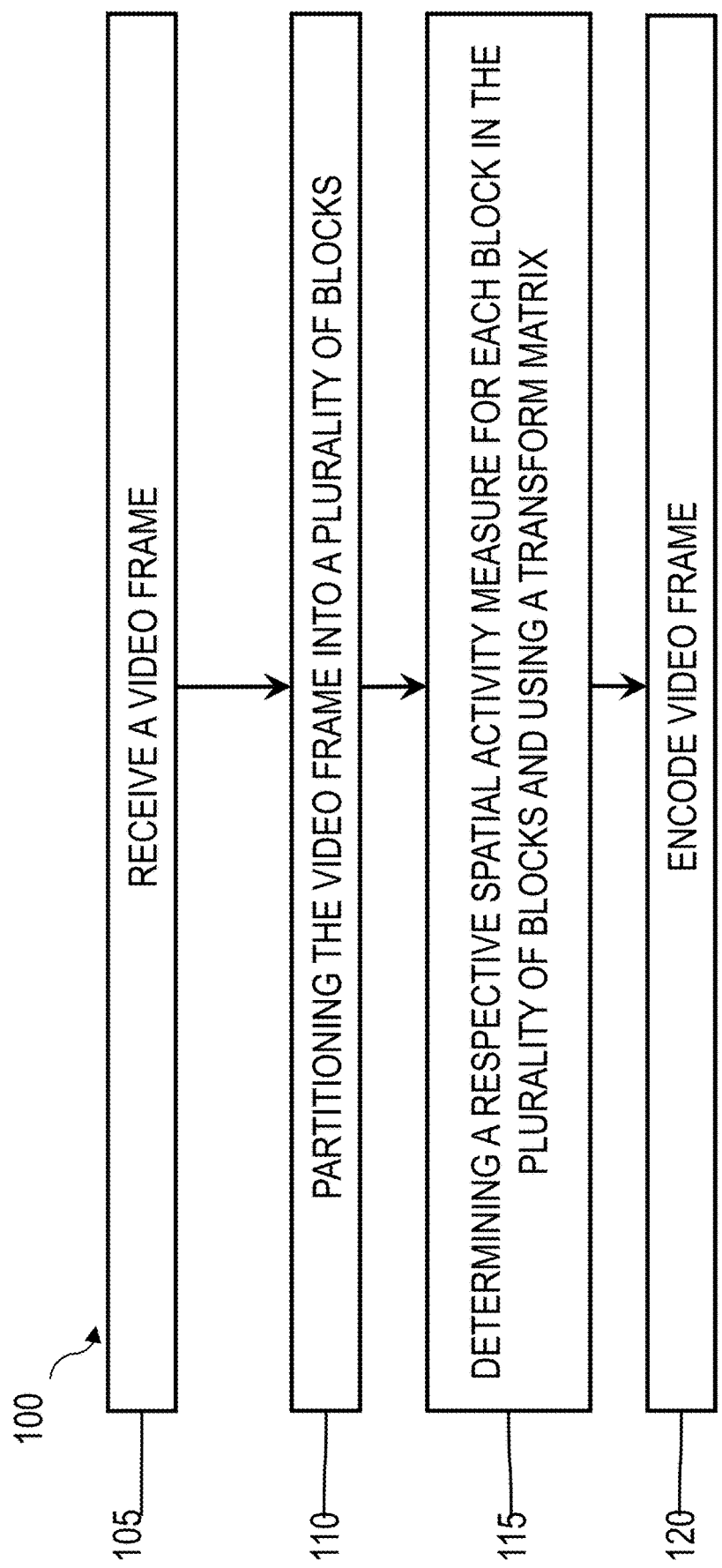
FIG. 1 is a process follow diagram illustrating an example process for encoding a video that can utilize transform matrices in determining a spatial activity measure, which can allow for improved encoder operation.

FIG. 1 is a process follow diagram illustrating an example process 100 for encoding a video that may utilize transform matrices in determining a spatial activity measure, which may allow for improved encoder operation. At step 105, a video frame is received by an encoder. This may be accomplished in any manner suitable for receiving a video in streaming and/or file form from any device and/or input port. Receiving video frame may include retrieval from memory of encoder and/or a computing device in communication with, incorporating, and/or incorporated in encoder. Receiving may include receiving from a remote device over a network. Receiving video frame may include receiving a plurality of video frames that combine to make up one or more videos.

At step 110, and still referring to FIG. 1, encoder may segment and/or partition video frame may be into blocks. The blocks may have any suitable shape or size as described above, including a size of 4 pixels by 4 pixels (4×4). A 4×4 size may be compatible with many standard video resolutions, which may be divided into an integer number of 4×4 blocks.

At step 115, and with continued reference to FIG. 1, encoder may determine a respective spatial activity measure for each block in the plurality of blocks. As used in this disclosure, a "spatial activity measure" is a quantity indicating how frequently and with what amplitude texture changes within a block. In other words, flat areas, such as sky, will have a low spatial activity measure, while complex areas such as grass will receive a high spatial activity measure. Determination of a respective spatial activity measure may include determination using a transform matrix, such without limitation a discrete cosine transformation matrix. Determining the respective spatial activity measure for each block may include determination using a generalized discrete cosine transformation matrix. For example, where blocks as described above are 4×4 blocks of pixels, the generalized discrete cosine transform matrix may include a generalized discrete cosine transform II matrix taking the form of:

$$T = \begin{pmatrix} a & a & a & a \\ b & c & -c & -b \\ a & -a & -a & a \\ c & -b & b & -c \end{pmatrix}$$

where a is ½, b is $$\sqrt{\frac{1}{2}} \cos\frac{\pi}{8},$$

and c is $$\sqrt{\frac{1}{2}} \cos\frac{3\pi}{8}.$$

In some implementations, an integer approximation of a transform matrix may be utilized, which may be used for efficient hardware and software implementations. For example, where blocks as described above are 4×4 blocks of pixels, a generalized discrete cosine transform matrix may include a generalized discrete cosine transform II matrix taking the form of:

$$T_{INT} = \begin{pmatrix} 1 & 1 & 1 & 1 \\ 2 & 1 & -1 & -2 \\ 1 & -1 & -1 & 1 \\ 1 & -2 & 2 & -1 \end{pmatrix}.$$

For each block $B_i$, a frequency content of the block may be calculated using:

$$F_{Bi} = T \times B_i \times T'.$$

where T' is a transverse of a cosine transfer matrix T, $B_i$ is a block represented as a matrix of numerical values corresponding to pixels in the block, such as a 4×4 matrix representing a 4×4 block as described above, and the operation x denotes matrix multiplication.

In some implementations, block fusion may be performed using the spatial activity measures. In block fusion, each block may be assigned to an area. For example, a first area within the video frame including a first grouping of a subset of the blocks may be determined. The first grouping may be based on the respective spatial activity measure. Blocks may be grouped into areas of similar frequency content thereby representing areas with similar spatial activity.

For example, determining the first area may include iterating over each of the plurality of blocks and, for each current block, comparing the spatial activity measure of the current block to a spatial activity measure of a preceding block and determining whether a difference is below a predefined threshold, and assigning the current block to the first area. The current block may be assigned to a second area in response to or based on determining that the difference is above the predefined threshold. Persons skilled in the art, upon reviewing the entirety of this disclosure, will be aware of various ways in which threshold comparison may be performed, including that assignment to a first block may alternatively or additionally be accomplished by determination that a degree of similarity exceeds a threshold and/or that assignment to a different group may be accomplished by determining that a degree of difference exceeds a threshold. A threshold may be stored in memory and/or generated using previously or concurrently received and/or calculated values, which may include any numerical values and/or measurements described in this disclosure.

Figure 2:
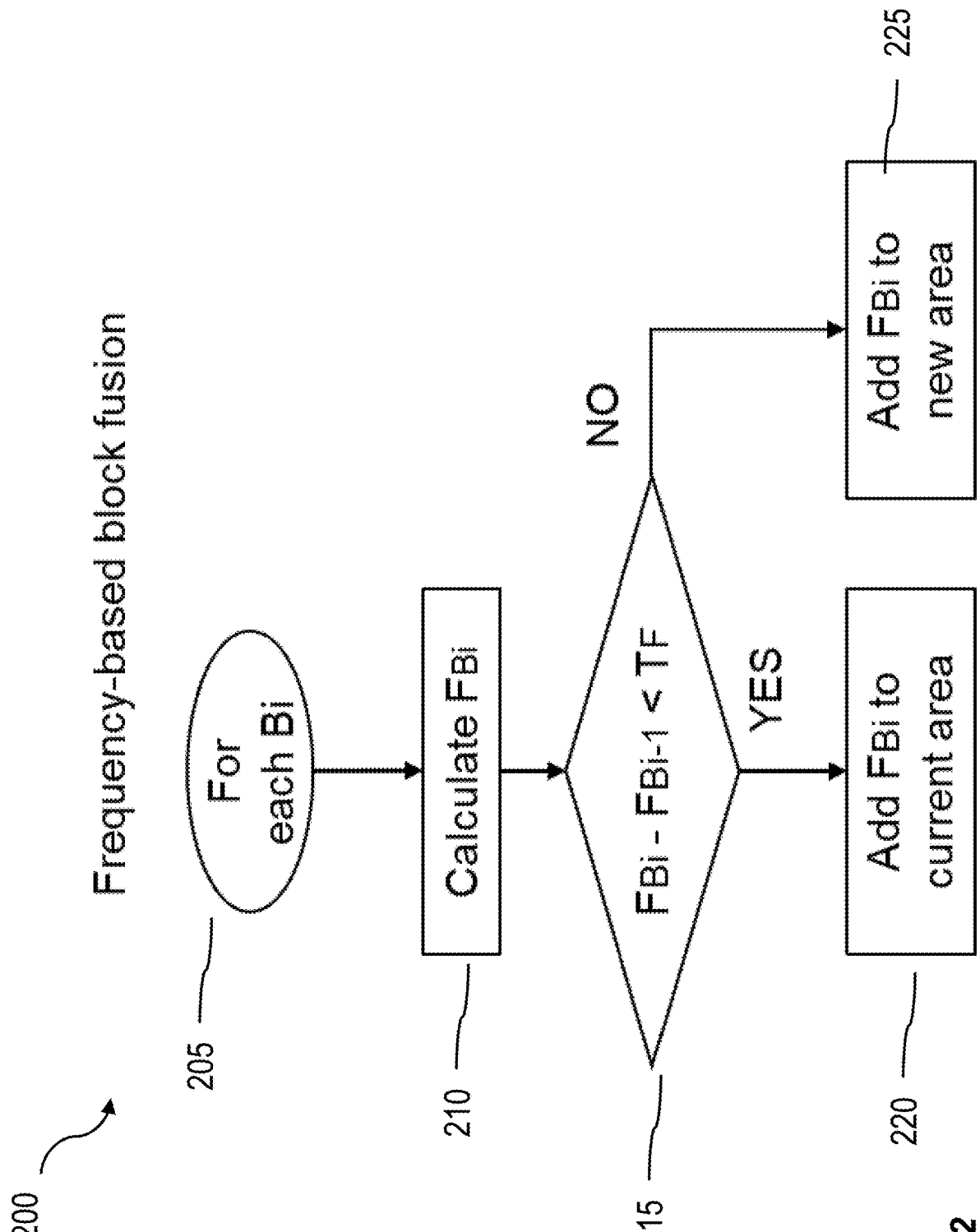
FIG. 2 is a process flow diagram illustrating an example process for performing frequency-based block fusion.

FIG. 2 is a process flow diagram illustrating an example process 200 for performing frequency-based block fusion. At 205, each block $B_i$ is iterated (e.g., at 205, i may be incremented by 1). At step 205, a frequency content of the block $F_{Bi}$ may be computed. At step 215, it may be determined whether a difference between the spatial activity measure of the current block $F_{Bi}$ and a spatial activity measure of a preceding block $F_{Bi-1}$ is below a predefined threshold $T_F$. If so, at step 220, then the current block $B_i$ is added to the current area. If not, then at step 225 the current block $B_i$ is added to a new or different area.

In some implementations, an average measure of information may be used for block fusion and may be determined, as a non-limiting example, according to a sum of information measures for individual blocks within first area, which may be weighted and/or multiplied by a significance coefficient, for instance a shown in the following sum:

$$A_N = S_N * \Sigma_{k=1}^{n} B_k$$

where N is a sequential number of the first area, $S_N$ is a significance coefficient, k is an index corresponding to a block of a plurality of blocks making up first area, n is a number of blocks making up the first area, $B_k$ is a measure of information of a block of the blocks, and $A_N$ is the first average measure of information. $B_k$ may include, for example, the measure of spatial activity computed using a discrete cosine transform of the block.

Significance coefficient $S_N$ may be supplied by an outside expert and/or calculated based on the characteristics of first area (e.g., fused blocks). A "characteristic" of an area, as used herein, is a measurable attribute of the area that is determined based upon its contents; a characteristic may be represented numerically using an output of one or more computations performed on first area. One or more computations may include any analysis of any signal represented by first area. One non-limiting example may include assigning higher $S_N$ for an area with a smooth background and a lower $S_N$ for an area with a less smooth background in quality modeling applications; as a non-limiting example, smoothness may be determined using Canny edge detection to determine a number of edges, where a lower number indicates a greater degree of smoothness. A further example of automatic smoothness detection may include use of fast Fourier transforms (FFT) over a signal in spatial variables over an area, where signal may be analyzed over any two-dimensional coordinate system, and over channels representing red-green-blue color values or the like; greater relative predominance in a frequency domain, as computed using an FFT, of lower frequency components may indicate a greater degree of smoothness, whereas greater relative predominance of higher frequencies may indicate more frequent and rapid transitions in color and/or shade values over background area, which may result in a lower smoothness score; semantically important objects may be identified by user input. Semantic importance may alternatively or additionally be detected according to edge configuration, and/or texture pattern. A background may be identified, without limitation, by receiving and/or detecting a portion of an area that represents significant or "foreground" object such as a face or other item, including without limitation a semantically important object. Another example may include assigning higher $S_N$ for the areas containing semantically important objects, such as human face; semantically important objects may be identified by user input.

In some implementations, frequency-based block fusion may be omitted in implementations where other information-processing algorithms are directly using the calculated $F_{Bi}$ values. One such implementation may include adaptive quantization, where quantization parameters are determined based on the $F_{Bi}$ values for each 4×4 block or groups of neighboring 4×4 blocks combined into 8×8, 16×16, 32×32 or 64×64 blocks, or any other suitable combination.

At step 120, the video frame may be encoded. The encoding may include controlling a quantization parameter based on the spatial activity measures, for example, an average spatial activity measure of a first area resulting from a block fusion process of the 4×4 blocks. Quantization parameter may include, be equal to, be proportional to, and/or be linearly related to a measure of quantization size. As used in this disclosure, a "quantization level" and/or "quantization size" is a numerical quantity indicative of an amount of information to be discarded in compression of a video frame; quantization level may include, without limitation, a number such as an integer by which one or more coefficients including without limitation transform coefficients is divided and/or reduced to reduce information content of encoded and subsequent decoded frame. Controlling may include determining a first quantization size based on first measure of information; quantization level may represent a direct or indirect measure of memory storage needed to capture information describing luma and/or chroma data of pixels in a block, where a greater number of bits may be needed to store information having a greater degree of variance as determined by first measure of information. Quantization size may be based upon first measure of information as described above, where quantization size may be larger for a larger first measure of information and smaller for a smaller first measure of information; quantization size may be proportional and/or linearly related to first measure of information. In general, greater information content may result in larger quantization size. By controlling quantization size, information about fused-block areas may be used for rate distortion optimization for encoding. Controlling may be further based on the second average measure of information of the second area.

Figure 3:
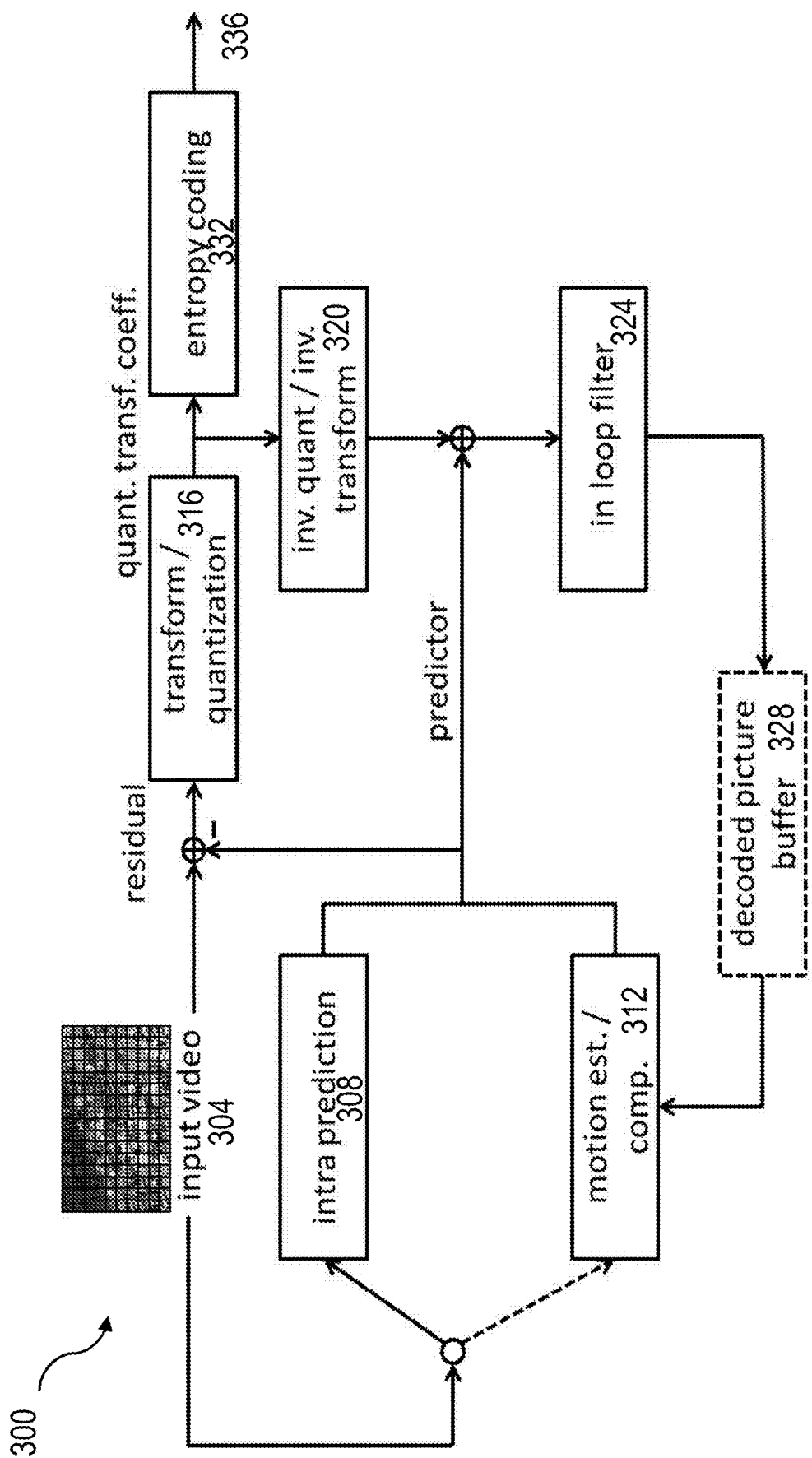
FIG. 3 is a system block diagram illustrating an example video encoder capable of encoding using a measure of spatial activity that can include computing frequency components utilizing transform matrices.

FIG. 3 is a system block diagram illustrating an example video encoder 200 capable of encoding using a measure of spatial activity that may include computing frequency components utilizing transform matrices. The example video encoder 300 receives an input video 304, which may be initially segmented or partitioned into 4×4 blocks for further processing.

The example video encoder 300 includes an intra prediction processor 308, a motion estimation/compensation processor 312 (also referred to as an inter prediction processor), a transform/quantization processor 316, an inverse quantization/inverse transform processor 320, an in-loop filter 324, a decoded picture buffer 328, and an entropy coding processor 332. Bit stream parameters may be input to the entropy coding processor 332 for inclusion in the output bit stream 336.

The transform/quantization processor 313 may be capable of performing block fusion and computing the measure of spatial activity that may include computing frequency components utilizing transform matrices for each block.

In operation, for each block of a frame of the input video 304, whether to process the block via intra picture prediction or using motion estimation/compensation may be determined. The block may be provided to the intra prediction processor 308 or the motion estimation/compensation processor 312. If the block is to be processed via intra prediction, the intra prediction processor 308 may perform the processing to output the predictor. If the block is to be processed via motion estimation/compensation, the motion estimation/compensation processor 312 may perform the processing.

A residual may be formed by subtracting the predictor from the input video. The residual may be received by the transform/quantization processor 316, which may perform transformation processing (e.g., discrete cosine transform (DCT)) to produce coefficients, which may be quantized. The quantized coefficients and any associated signaling information may be provided to the entropy coding processor 332 for entropy encoding and inclusion in the output bit stream 336. In addition, the quantized coefficients may be provided to the inverse quantization/inverse transformation processor 320, which may reproduce pixels, which may be combined with the predictor and processed by the in-loop filter 324, the output of which is stored in the decoded picture buffer 328 for use by the motion estimation/compensation processor 312.

It is to be noted that any one or more of the aspects and embodiments described herein may be conveniently implemented using digital electronic circuitry, integrated circuitry, specially designed application specific integrated circuits (ASICs), field programmable gate arrays (FPGAs) computer hardware, firmware, software, and/or combinations thereof, as realized and/or implemented in one or more machines (e.g., one or more computing devices that are utilized as a user computing device for an electronic document, one or more server devices, such as a document server, etc.) programmed according to the teachings of the present specification, as will be apparent to those of ordinary skill in the computer art. These various aspects or features may include implementation in one or more computer programs and/or software that are executable and/or interpretable on a programmable system including at least one programmable processor, which may be special or general purpose, coupled to receive data and instructions from, and to transmit data and instructions to, a storage system, at least one input device, and at least one output device. Appropriate software coding may readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, Programmable Logic Devices (PLDs), and/or any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 4:
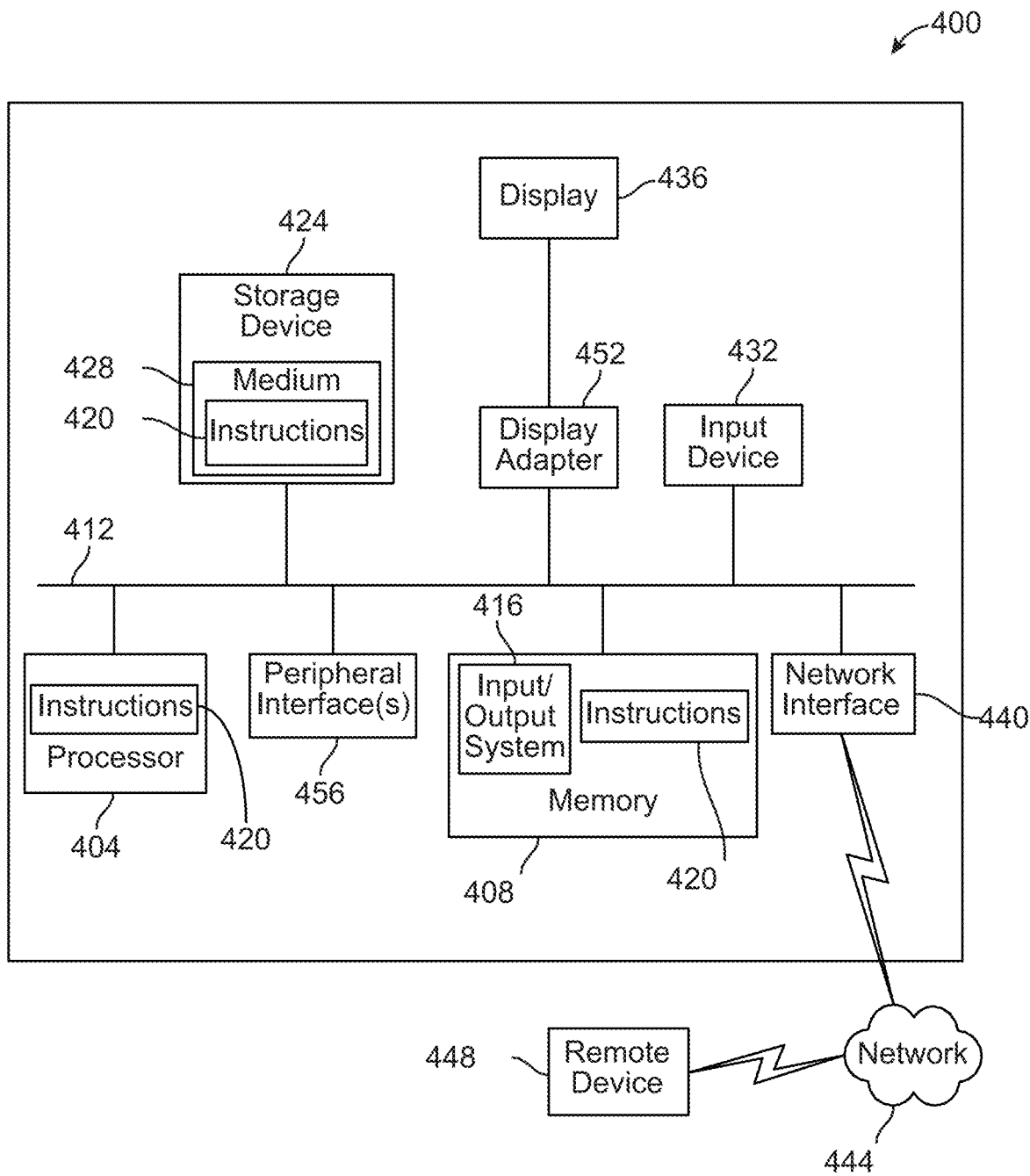
FIG. 4 is a block diagram of a computing system that can be used to implement any one or more of the methodologies disclosed herein and any one or more portions thereof.

FIG. 4 shows a diagrammatic representation of one embodiment of a computing device in the exemplary form of a computer system 400 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 400 includes a processor 404 and a memory 408 that communicate with each other, and with other components, via a bus 412. Bus 412 may include any of several types of bus structures including, but not limited to, a memory bus, a memory controller, a peripheral bus, a local bus, and any combinations thereof, using any of a variety of bus architectures.

Memory 408 may include various components (e.g., machine-readable media) including, but not limited to, a random-access memory component, a read only component, and any combinations thereof. In one example, a basic input/output system 416 (BIOS), including basic routines that help to transfer information between elements within computer system 400, such as during start-up, may be stored in memory 408. Memory 408 may also include (e.g., stored on one or more machine-readable media) instructions (e.g., software) 420 embodying any one or more of the aspects and/or methodologies of the present disclosure. In another example, memory 408 may further include any number of program modules including, but not limited to, an operating system, one or more application programs, other program modules, program data, and any combinations thereof.

Computer system 400 may also include a storage device 424. Examples of a storage device (e.g., storage device 424) include, but are not limited to, a hard disk drive, a magnetic disk drive, an optical disc drive in combination with an optical medium, a solid-state memory device, and any combinations thereof. Storage device 424 may be connected to bus 412 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 424 (or one or more components thereof) may be removably interfaced with computer system 400 (e.g., via an external port connector (not shown)). Particularly, storage device 424 and an associated machine-readable medium 428 may provide nonvolatile and/or volatile storage of machine-readable instructions, data structures, program modules, and/or other data for computer system 400. In one example, software 420 may reside, completely or partially, within machine-readable medium 428. In another example, software 420 may reside, completely or partially, within processor 404.

Computer system 400 may also include an input device 432. In one example, a user of computer system 400 may enter commands and/or other information into computer system 400 via input device 432. Examples of an input device 432 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 432 may be interfaced to bus 412 via any of a variety of interfaces (not shown) including, but not limited to, a serial interface, a parallel interface, a game port, a USB interface, a FIREWIRE interface, a direct interface to bus 412, and any combinations thereof. Input device 432 may include a touch screen interface that may be a part of or separate from display 436, discussed further below. Input device 432 may be utilized as a user selection device for selecting one or more graphical representations in a graphical interface as described above.

A user may also input commands and/or other information to computer system 400 via storage device 424 (e.g., a removable disk drive, a flash drive, etc.) and/or network interface device 440. A network interface device, such as network interface device 440, may be utilized for connecting computer system 400 to one or more of a variety of networks, such as network 444, and one or more remote devices 448 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 444, may employ a wired and/or a wireless mode of communication. In general, any network topology may be used. Information (e.g., data, software 420, etc.) may be communicated to and/or from computer system 400 via network interface device 440.

Computer system 400 may further include a video display adapter 452 for communicating a displayable image to a display device, such as display device 436. Examples of a display device include, but are not limited to, a liquid crystal display (LCD), a cathode ray tube (CRT), a plasma display, a light emitting diode (LED) display, and any combinations thereof. Display adapter 452 and display device 436 may be utilized in combination with processor 404 to provide graphical representations of aspects of the present disclosure. In addition to a display device, computer system 400 may include one or more other peripheral output devices including, but not limited to, an audio speaker, a printer, and any combinations thereof. Such peripheral output devices may be connected to bus 412 via a peripheral interface 456. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve embodiments as disclosed herein. Accordingly, this description is meant to be taken only by way of example, and not to otherwise limit the scope of this invention.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. An inverse quantizer and inverse transform processor, the processor configured to:
   receive a video signal generated from a picture, the picture having been processed at an encoder by:
   segmenting the picture into a plurality of blocks;
   obtaining a residual for each block of the plurality of blocks using a predictor;
   applying a transform to each residual to obtain a transformed block;
   determining a spatial activity for each transformed block; and
   determining if each block of the plurality of blocks is assigned to a first area of the picture or a second area of the picture by determining if a difference between the spatial activity of the block and the spatial activity of a neighboring block is larger or smaller than a threshold, the blocks in the first area having been assigned by the encoder a first quantization parameter, the blocks in the second area having been assigned by the encoder a second quantization parameter;
   inverse quantize the blocks of the first area using the first quantization parameter; and
   inverse quantize the blocks of the second area using the second quantization parameter.

2. The processor of claim 1, further configured to:
   inverse transform the inverse quantized blocks of the first area, and
   inverse transform the inverse quantized blocks of the second area.

3. The processor of claim 1, wherein the transform is a Discrete Cosine Transform.

4. The processor of claim 2, further comprising:
   an in-loop filter; and
   a decoded picture buffer.

5. The processor of claim 1, wherein each block of the plurality of blocks is 128×128.

6. A method, the method comprising:
   receiving, using an inverse quantizer and inverse transform processor, a video signal generated from a picture, the picture having been processed at an encoder by:
   segmenting the picture into a plurality of blocks;
   obtaining a residual for each block of the plurality of blocks using a predictor;
   applying a transform to each residual to obtain a transformed block;
   determining a spatial activity for each transformed block; and
   determining if each block of the plurality of blocks is assigned to a first area of the picture or a second area of the picture by determining if a difference between the spatial activity of the block and the spatial activity of a neighboring block is larger or smaller than a threshold, the blocks in the first area having been assigned by the encoder a first quantization parameter, the blocks in the second area having been assigned by the encoder a second quantization parameter;
   inverse quantizing, using the inverse quantizer and inverse transform processor, the blocks of the first area using the first quantization parameter; and
   inverse quantizing, using the inverse quantizer and inverse transform processor, the blocks of the second area using the second quantization parameter.

7. The method of claim 6, further comprising:
   inverse transforming, using the inverse quantizer and inverse transform processor, the inverse quantized blocks of the first area, and
   inverse transforming, using the inverse quantizer and inverse transform processor, the inverse quantized blocks of the second area.

8. The method of claim 6, wherein the transform is a Discrete Cosine Transform.

9. The method of claim 7, wherein the inverse quantizer and inverse transform processor comprises an in-loop filter and a decoded picture buffer.

10. The method of claim 6, wherein each block of the plurality of blocks is 128×128.

* * * * *